(12) United States Patent
Tanaka et al.

(10) Patent No.: US 6,487,481 B2
(45) Date of Patent: Nov. 26, 2002

(54) PARKING ASSISTING APPARATUS

(75) Inventors: Yuu Tanaka, Aichi-ken (JP); Toshiaki Kakinami, Nagoya (JP); Yoshifumi Iwata, Anjo (JP); Kazushi Konno, Chita (JP); Toshiyasu Katsuno, Nagoya (JP); Yuichi Kubota, Toyota (JP); Osamu Okazaki, Nissin (JP)

(73) Assignees: Aisin Seiki Kabushiki Kaisha, Aichi-ken (JP); Toyoda Jidoshakabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/866,757

(22) Filed: May 30, 2001

(65) Prior Publication Data

US 2002/0026269 A1 Feb. 28, 2002

(30) Foreign Application Priority Data

| May 30, 2000 | (JP) | ............... 2000-160219 |
| May 30, 2000 | (JP) | ............... 2000-160220 |
| Nov. 21, 2000 | (JP) | ............... 2000-354817 |

(51) Int. Cl.$^7$ .................................. G06F 7/00
(52) U.S. Cl. ......................... 701/41; 340/932.2
(58) Field of Search ................. 701/41, 36, 23, 701/28; 318/580, 587; 340/932.2

(56) References Cited

U.S. PATENT DOCUMENTS 5,742,141 A * 4/1998 Czekaj ................ 318/567
5,945,799 A * 8/1999 Shimizu .............. 318/587
5,969,969 A * 10/1999 Ejiri et al. ........... 364/424.051
6,078,849 A * 6/2000 Brady et al. .......... 701/28

FOREIGN PATENT DOCUMENTS

| JP | 63-191987 | 8/1988 |
| JP | 2-36417 | 8/1990 |
| JP | 2 610 146 | 2/1997 |
| JP | 2 676 971 | 7/1997 |
| JP | 11-334470 | 12/1999 |

* cited by examiner

Primary Examiner—Yonel Beaulieu
(74) Attorney, Agent, or Firm—Sughrue Mion, PLLC

(57) ABSTRACT

A parking assisting apparatus displays an image of a rear view from a vehicle, which is acquired by a camera, on a display located in a passenger compartment, thus assisting in a parking procedure. The parking procedure assisted by the parking assisting apparatus is, for example, a parallel parking procedure in which the rotating direction of the steering wheel must be switched. An assumed path along which the vehicle is moved during the parking procedure is determined in accordance with the steering angle of the steering wheel when the parking procedure is started. In the parking procedure, the display indicates a steering information that informs the driver of a timing at which the rotating direction of the steering wheel must be switched, in accordance with the assumed path.

20 Claims, 11 Drawing Sheets

Fig.8

| Step | Display | Driver's operation | Audio instruction | Initial condition for starting step |
|---|---|---|---|---|
| (1) | | To turn on the second mode switch. | | The second mode switch is turned on |
| (2) | 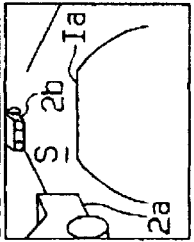 | To shift the shift lever to reverse position. | "The assisted parking procedure is started." | The reverse sensor is turned on. |
| (3) | 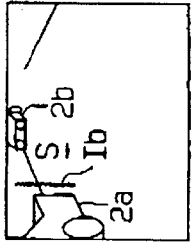 | • To reverse the vehicle until the reference marker Ib corresponds to the rear right corner of the adjacent vehicle.<br>• To stop the vehicle and then rotate the steering wheel. | "Reverse the vehicle until the reference marker corresponds to the rear end of the adjacent vehicle."<br><br>"Steer the steering wheel to locate the parking frame at a desired parking position." | |
| (4) | | | "Reverse the vehicle after the parking frame corresponds to the parking space." | The steering angle is equal to or greater than the predetermined value |

Fig. 9

| Step | Display | Driver's operation | Audio instruction | Initial condition for starting step |
|---|---|---|---|---|
| (5) | 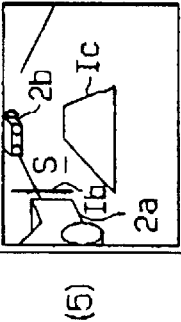 | To rotate the steering wheel until the parking frame is moved to a desired position. | | |
| (6) | 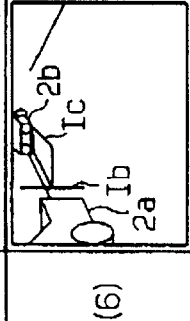 | To reverse the vehicle while maintaining the steering angle at the determined angle. | "Reverse the vehicle without moving the steering wheel." | |
| (7) | | | | The angular change of the vehicle is altered. |
| (8) | 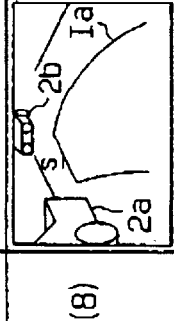 | To continuously reverse the vehicle while maintaining the steering angle at the determined angle. | "Rotate the steering wheel rightward to the maximum angle after the assumed rightward path reaches the road shoulder." | |
| (9) | | | | The turning amount of the vehicle reaches the predetermined value. |

Fig.10

| Step | Display | Driver's operation | Audio instruction | Initial condition for starting step |
|---|---|---|---|---|
| (10) | | To continuously reverse the vehicle until the assumed path Id reaches the road shoulder. | | |
| (11) | | To stop the vehicle and then rotate the steering wheel rightward to the maximum angle. | | |
| (12) | | | "Reverse the vehicle without moving the steering wheel." | The steering angle reaches the maximum value. |
| (13) | | To reverse the vehicle while maintaining the steering angle at the maximum value. | | |
| (14) | | | "Check the rear view." | The vehicle angular difference is smaller than the predetermined value. |
| (15) | | To stop the vehicle. | | |
| (16) | | | "The assisted parking procedure is completed." | The vehicle is stopped. |

PARKING ASSISTING APPARATUS

This application is based on and claims under 35 U. S. C. §119 with respect to Japanese Patent Application No. 2000-160220 filed on May 30, 2000, Japanese Patent Application No. 2000-354817 filed on Nov. 21, 2000 and Japanese Patent Application No. 2000-160219 filed on May 30, 2000, the entire contents of which is incorporated herein by reference.

BACKGROUND OF THE INVENTION

The present invention relates to parking assisting apparatus that assist in a parking procedure by displaying an image of a view, as viewed in a direction in which a vehicle moves, on a display located in a passenger compartment.

A typical parking assisting apparatus, which is described in Japanese Patent No. 1610702 or Japanese Patent No. 2610146, includes a camera and a display. The camera acquires an image of a rear view from a vehicle, and the display shows the acquired image. When a parking procedure is started, the parking assisting apparatus assumes a path along which the vehicle is moved during the procedure in accordance with the steering angle of the steering wheel. The assumed path appears on the display, in addition to the image of the rear view from the vehicle. The parking procedure is thus continued with the aid of the image on the display. This makes it easy for the driver to complete the parking procedure.

For example, if the vehicle is parked in a space between a pair of vehicles that are parked along a road shoulder, the steering wheel of the vehicle is first rotated in one direction such that the vehicle is reversed while turning in the corresponding direction. Subsequently, the steering wheel is rotated in the other direction such that the vehicle is reversed while turning in the corresponding direction. However, the aforementioned parking assisting apparatus does not inform the driver of an optimal timing at which the rotating direction of the steering wheel should be switched. Accordingly, the parking assisting apparatus does not sufficiently assist in the parking procedure in which the rotating direction of the steering wheel must be switched. As a result, the parking procedure is not sufficiently simplified for the driver.

SUMMARY OF THE INVENTION

Accordingly, it is an objective of the present invention to provide a parking assisting apparatus that informs a driver of an optimal timing at which the rotating direction of a steering wheel should be switched.

To achieve the foregoing and other objectives and in accordance with the purpose of the present invention, the invention provides a parking assisting apparatus that displays an image of a view acquired by a camera, as viewed in a direction in which a vehicle moves, on a display located in a passenger compartment, thus assisting in a parking procedure performed by a driver. The parking procedure includes a first step and a second step. In the first step, the vehicle is moved with a steering device rotated in one direction. In the second step, the vehicle is moved with the steering device rotated in a direction opposite to that of the first step. The parking assisting apparatus is characterized by a control means, which assumes a path along which the vehicle is moved during the parking procedure. The control means determines an initial steering angle of the steering device. The initial steering angle corresponds to the steering angle of the steering device when initiating the parking procedure. The control means assumes the path of the vehicle, based on the assumption that the first step is performed with the initial steering angle and the second step is performed with the steering angle maintained at a predetermined value after the steering device is rotated in the opposite direction. The control means instructs the display to indicate a steering information that informs the driver of a timing at which the steering device must be rotated in the opposite direction in accordance with the assumed path.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a chart explaining an assisted parallel parking procedure;

FIG. 9 is a chart explaining the assisted parallel parking procedure;

FIG. 10 is a chart explaining the assisted parallel parking procedure;

DETAILED DESCRIPTION OF THE PREFERRED EMBODIMENTS (First Embodiment)

A first embodiment of the present invention will now be described with reference to FIGS. 1 to 10.

Figure 1:
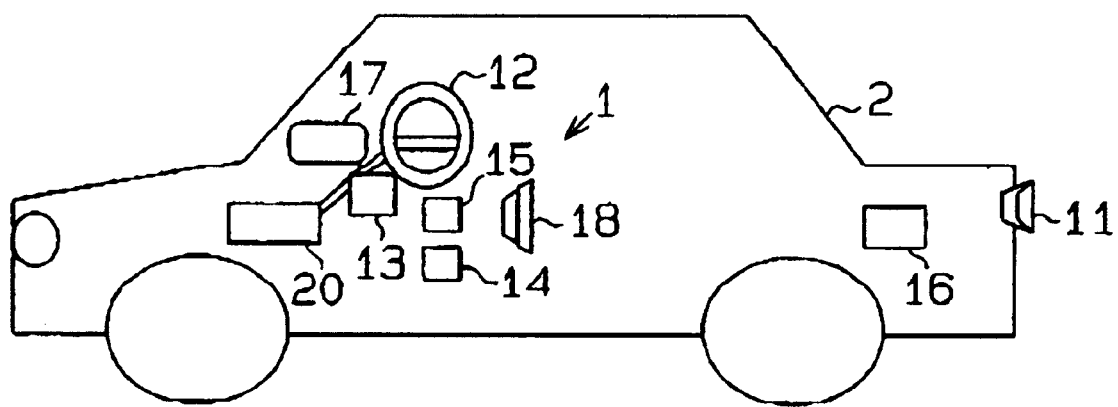
FIG. 1 is a view schematically showing a vehicle equipped with a parking assisting apparatus of a first embodiment according to the present invention.

FIG. 1 schematically shows a vehicle 2 equipped with a parking assisting apparatus 1 of the first embodiment. The parking assisting apparatus 1 includes a camera (CCD camera) 11, a steering angle sensor 13, a reverse sensor 14, a parking switch 15, a yaw rate sensor 16, a display 17, a speaker 18, and a controller 20. The camera 11 acquires an image of a rear view from the vehicle 2 when the vehicle 2 is reversed during a parking procedure. The steering angle sensor 13 detects a steering angle of a steering wheel 12. The reverse sensor 14 detects that a lift lever (not shown) is shifted to "reverse" position. The parking switch 15 is manipulated to activate the parking assisting apparatus 1. The yaw rate sensor 16 detects a rotational angular speed of the vehicle 2 with respect to the axis of the vehicle 2.

Figure 3:
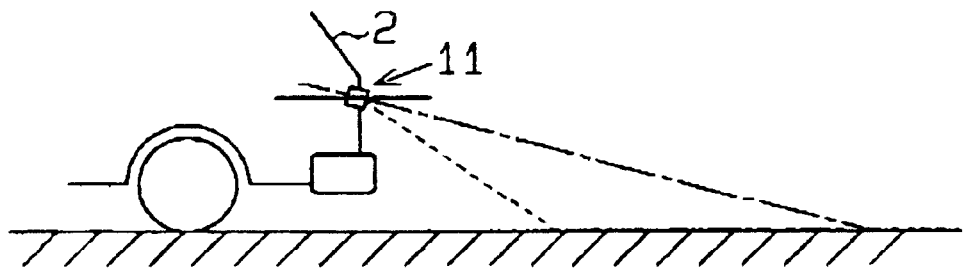
FIG. 3 is a side view showing a camera attached to the vehicle.
Figure 4:
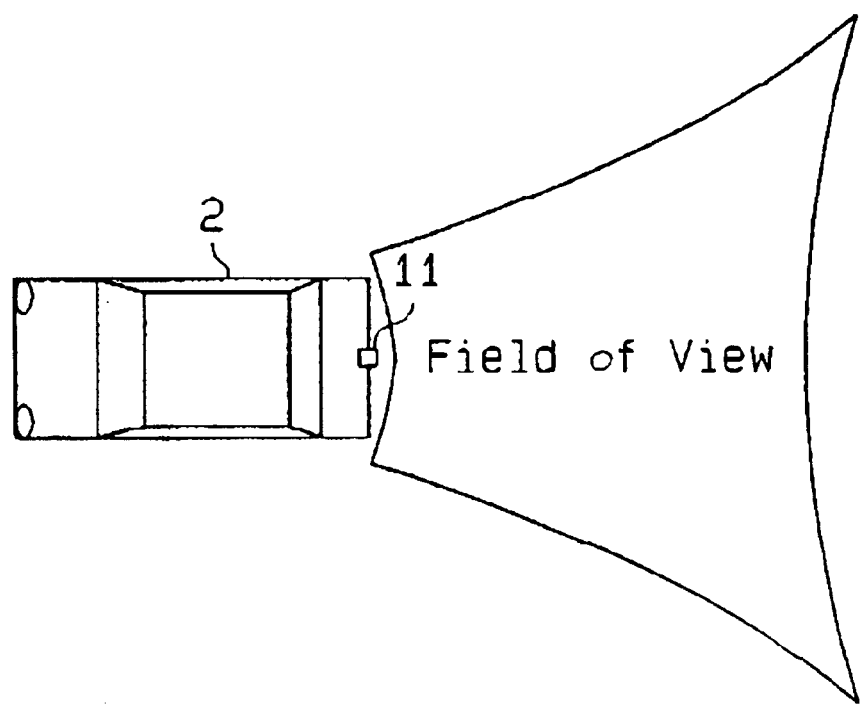
FIG. 4 is a plan view showing a field of view of the camera.

The camera 11 is located, for example, at the substantial middle of the rear side of the vehicle 2 such that the optical axis of the camera 11 faces downward. More specifically, as shown in FIG. 3, the camera 11 is attached to the substantial middle portion of the rear side of the vehicle 2 with the optical axis of the camera 11 facing downward at a predetermined angle (for example, thirty degrees). Further, as shown in FIG. 4, the camera 11 includes a wide angle lens that has a field of view corresponding to an angle of 140 degrees. The field of view along the axis of the vehicle 2 is, for example, eight meters.

The steering angle sensor 13 is a known sensor that detects a steering angle of the steering wheel 12. The steering angle sensor 13 is, for example, accommodated in the interior of the steering wheel 12.

Figure 2:
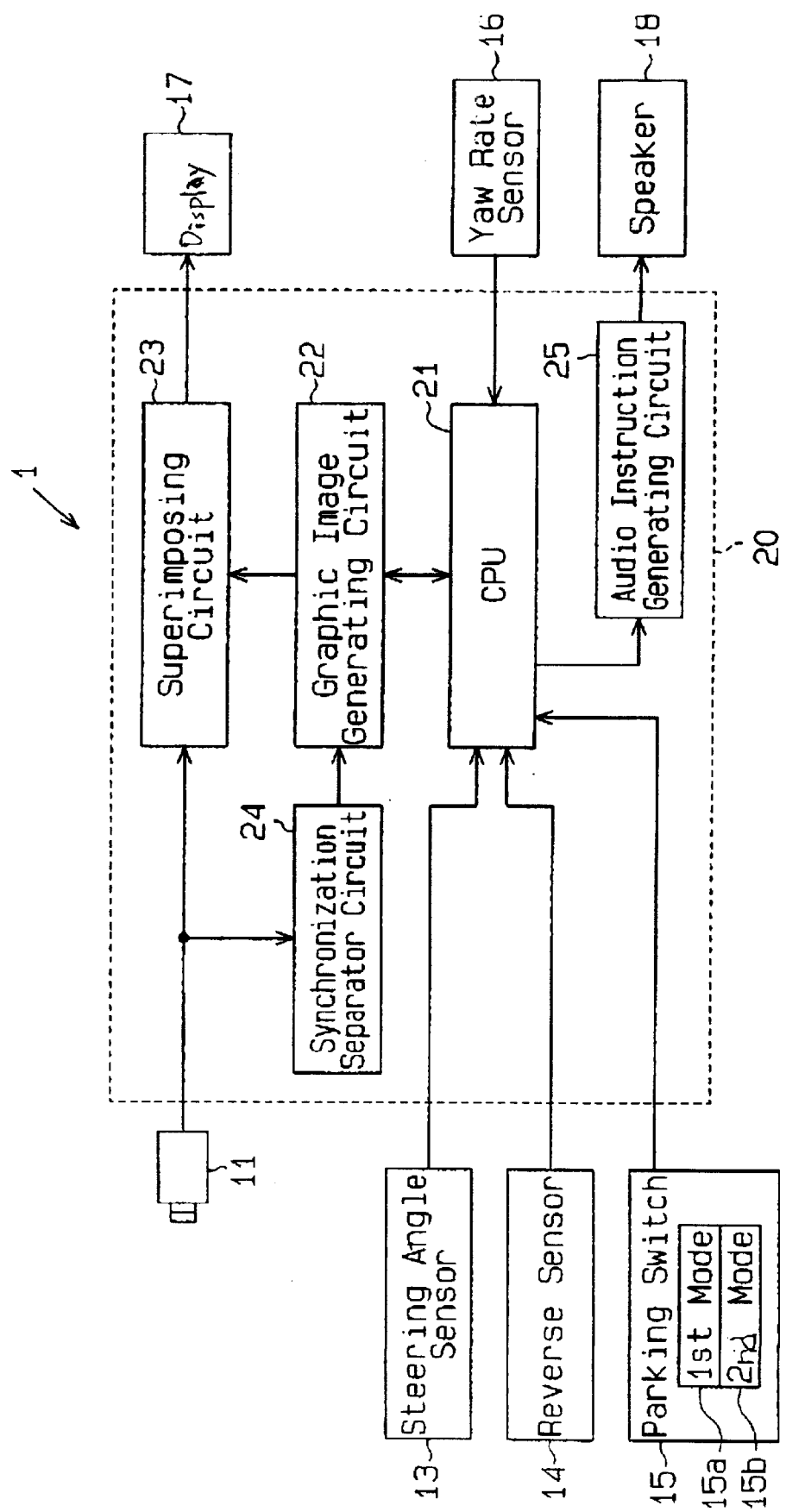
FIG. 2 is a block diagram showing the parking assisting apparatus of FIG. 1.

The parking switch 15, which is operated to activate the parking assisting apparatus 1, is located, for example, in the vicinity of a central console box such that the driver easily manipulates the parking switch 15. The parking switch 15 includes a pair of operational mode switches, or a first mode switch 15a and a second mode switch 15b, as shown in FIG. 2. When the vehicle 2 is parallel-parked, the second switch 15b is turned on. Otherwise, the first mode switch 15a is turned on. That is, the parking switch 15 is selectively switched between a parking mode corresponding to the first switch 15a and a parking mode corresponding to the second switch 15b.

Figure 5:
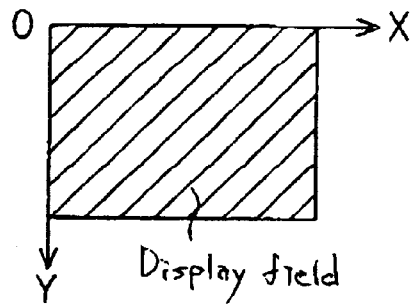
FIG. 5 is a view showing a display field of a display.

The display 17 is located, for example, at the central console box. The display 17 shows a live image of the rear view from the vehicle 2 combined with a graphic image as a reference for an assisted parking procedure. FIG. 5 shows a display field of the display 17.

The speaker 18 diffuses prescribed audio instructions corresponding to each step of the parking procedure, which will be later described.

The controller 20 is accommodated, for example, in the interior of an instrument panel. The camera 11, the steering angle sensor 13, the reverse sensor 14, the parking switch 15, and the yaw rate sensor 16 each send a signal to the controller 20. Depending on the signal, the controller 20 displays the image of the rear view from the vehicle 2 combined with the graphic image while generating a corresponding audio instruction.

FIG. 2 diagrammatically shows a control system of the parking assisting apparatus 1. As shown in FIG. 2, the controller 20 of the parking assisting apparatus 1 includes a central processing unit (CPU) 21, a graphic image generating circuit 22, a superimposing circuit 23, a synchronization separator circuit 24, and an audio instruction generating circuit 25. The graphic image generating circuit 22 generates a graphic image that appears on the display 17. The superimposing circuit 23 superimposes a signal indicating the graphic image on the rear view image from the vehicle 2, which is acquired by the camera 11. The synchronization separator circuit 24 extracts a synchronization signal from the image of the camera 11 and supplies the signal to the graphic image generating circuit 22. The audio instruction an generating circuit 23 generates an audio instruction that is diffused by the speaker 18.

Figure 6:
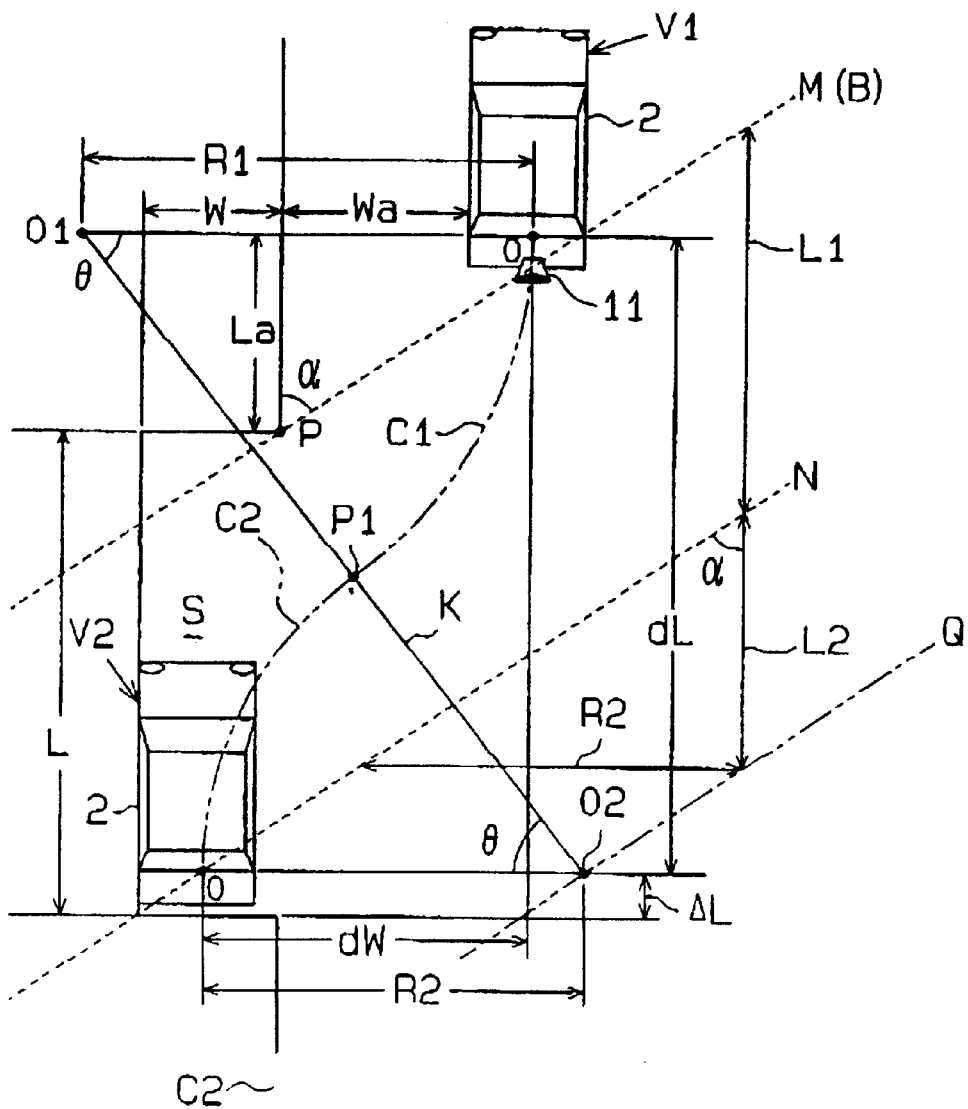
FIG. 6 is a plan view showing an initial position and a target position of the vehicle that is parallel-parked in a parking space.
Figure 7:
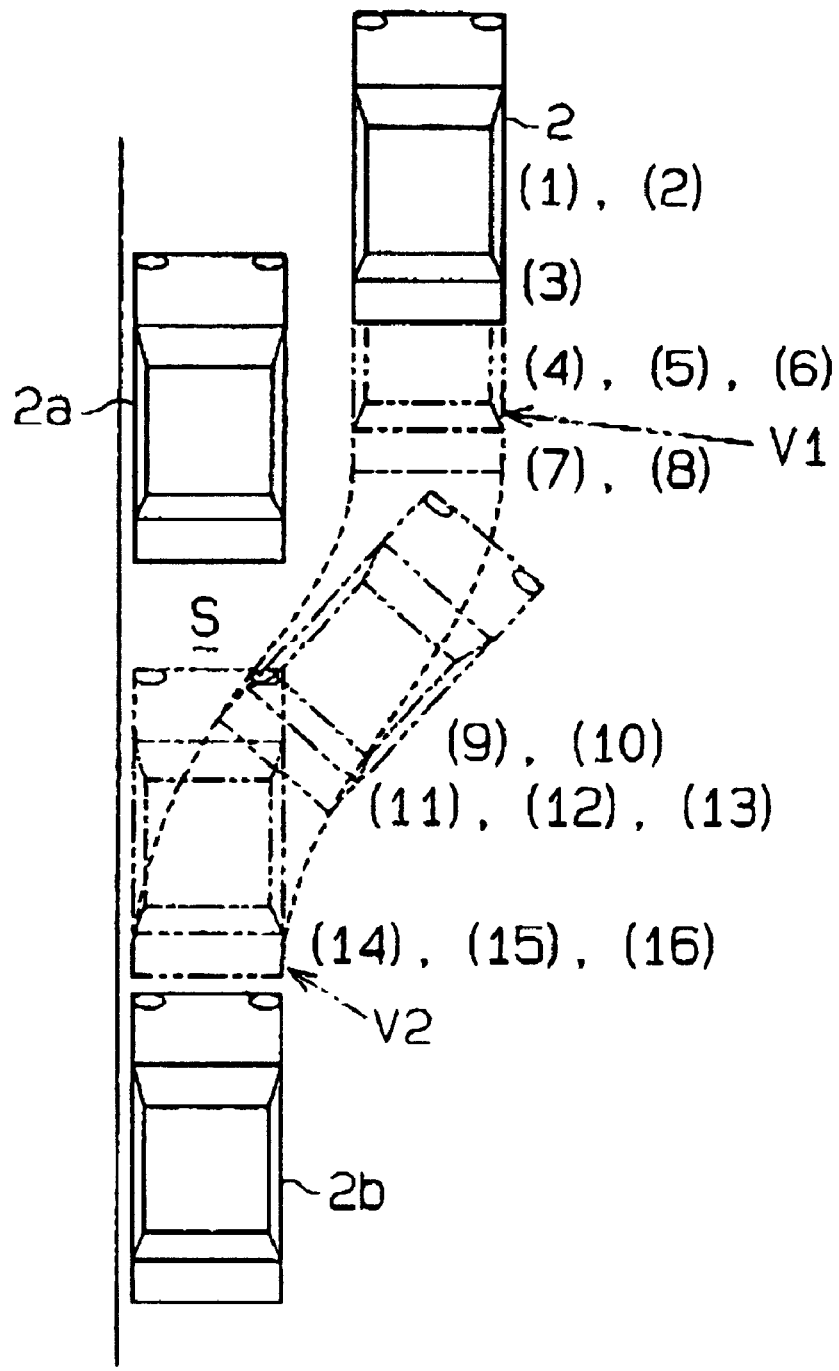
FIG. 7 is a plan view showing the movement of the vehicle that is parallel-parked in the parking space.

As shown in FIGS. 6 and 7, when the vehicle 2 is parallel-parked in a parking space S located leftward as viewed from the driver, the steering wheel 12 is first rotated leftward such that the vehicle 2 is reversed while turning leftward. Subsequently, the steering wheel 12 is rotated rightward such that the vehicle 2 is reversed while turning rightward. In contrast, when the vehicle 2 is parallel-parked in a parking space located rightward as viewed from the driver, the steering wheel 12 is rotated in opposite directions to those described above such that the vehicle 2 is reversed in corresponding directions. In this embodiment, if the second mode switch 12b is turned on, the parking procedure of the vehicle 2 is assisted by the image appearing on the display 17 and the audio instructions diffused by the speaker 18.

For example, as shown in FIG. 6, if the vehicle 2 is parallel-parked in the parking space S, which is located leftward as viewed from the driver, the vehicle 2 is first stopped at a predetermined initial position V1. The steering wheel 12 is then rotated leftward. A path along which the vehicle 2 is moved from the initial position V1 to a terminating point of the path, or a target position V2, is determined in accordance with the steering angle of the steering wheel 12. As shown in FIG. 9, the display 17 shows a parking frame Ic that indicates the terminating point of the path, or the target position V2. More specifically, the steering angle of the steering wheel 12 is adjusted to locate the parking frame Ic at a desired position in the parking space S, as viewed on the display 17. Subsequently, the vehicle 2 is reversed while maintaining the steering angle of the steering wheel 12 at the adjusted value.

FIG. 6 geometrically explains the initial position V1 and the target position V2 of the vehicle 2. As shown in FIG. 6, when the vehicle 2 is located at the initial position V1 or the target position V2, a fore-and-aft direction of the vehicle 2, or a longitudinal direction of the vehicle 2, extends parallel with a longitudinal direction of the parking space S. The point O represents a midpoint between the rear wheels of the vehicle 2. If the vehicle 2 is moved from the initial position V1 to the target position V2, the point O is moved correspondingly by a movement amount dL in the longitudinal direction of the parking space S and by a movement amount dW in the lateral direction of the parking space S. The controller 20 stores a longitudinal dimension L and a lateral dimension W of the parking space S. The dimensions L, W do not represent actual dimensions of the parking space S, which are varied case by case. Instead, the dimensions L, W are predetermined values corresponding to a minimum space needed for parking the vehicle 2.

As shown in FIG. 6, a line M crosses a reference point P, which is located at a corner of the parking space S, and intersects the camera 11. It is defined that the vehicle 2 is located at the initial position V1 when the line M forms an angle a with respect to the longitudinal direction of the parking space S. The lateral interval between the reference point P and a left side of the vehicle 2 located at the initial position V1 is indicated by a reference index Wa. The longitudinal interval between the reference point P and the point O, which corresponds to the midpoint between the rear wheels of the vehicle 2 located at the initial position V1, is indicated by a reference index La. When the vehicle 2 is located at the initial position V1, the rate La/Wa becomes a predetermined constant value.

When the vehicle 2 is located at the target position V2, the point O is longitudinally spaced from the line M by an interval L1 and is located on a line N that extends parallel with the line M. In other words, it is defined that the vehicle 2 is located at the target position V2 when the point O is located on the line N. The interval L1 is a predetermined value selected in accordance with the dimensions L, W of the parking space S, which are stored in the controller 20.

As shown in FIG. 6, if the steering wheel 12 is rotated leftward when the vehicle 2 is stopped at the initial position V1 with the second mode switch 12b turned on, an assumed path of the point O during the parking procedure is obtained in relation to the steering angle of the steering wheel 12, using a known method. The method is described in, for example, Japanese Unexamined Patent Publication No. 11-334470. Further, when the steering direction of the vehicle 2 is switched at a later stage, the steering wheel 12 is rotated rightward to a maximum steering angle.

The assumed path of the point O includes a first arched path C1 and a second arched path C2. The first arched path C1 is determined in relation to the steering angle of the steering wheel 12 when the vehicle 2 is steered leftward. The second arched path C2 is determined in relation to the steering angle of the steering wheel 12 when the vehicle 2 is steered rightward, which is the maximum steering angle. The radius of the first arched path C1, or a first turning radius, is indicated by a reference index R1, and the center of the first arched path C1 is indicated by a reference index O1. Likewise, the radius of the second arched path C2, or a second turning radius, is indicated by a reference index R2, and the center of the second arched path C2 is indicated by a reference index O2.

More specifically, the starting point of the first arched path C1 corresponds to the point O of the vehicle 2 located at the initial position V1. The second arched path C2 forms a circumscribed circle with respect to the first arched path C1. Further, a tangential line of the second arched path C2 that crosses the point at which the second arched path C2 crosses the line N extends parallel with the longitudinal direction of the parking space S. In other words, if a certain arch with the second turning radius R2 forms a circumscribed circle with respect to the first arched path C1 and a tangential line of the arch that crosses the point at which the arch crosses the line N extends parallel with the longitudinal direction of the parking space S, the arch is selected as the second arched path C2. The point at which the second arched path C2 crosses the line N corresponds to the point O of the vehicle 2 located at the target position V2, or the terminating point of the assumed path of the vehicle 2. During the parking procedure with the parking assisting apparatus 1, the display 17 shows the parking frame Ic that represents the terminating point of the assumed path (see FIG. 9).

The center O2 of the second arched path C2 is located on a line Q, which extends parallel with the line N. The longitudinal interval between the lines N, Q is equal to the second turning radius R2 and is indicated by R2·cotá.

The first arched path C1 contacts the second arched path C2 at a point P1. The point P1 is located on a line K, which crosses the center O1 of the first arched path C1 and the center O2 of the second arched path C2. An angle at which the point O is rotated along the first arched path C1 with respect to the center O1, or a rotational angle è, is equal to an angle at which the point O is rotated along the second arched path C2 with respect to the center O2, which is also defined as the rotational angle è. When the point O of the vehicle 2 reaches the point P1, the steering direction of the steering wheel 12 is switched from the leftward direction to the rightward direction.

When the vehicle 2 is moved from the initial position V1 to the target position V2 in the parking procedure, the longitudinal movement amount dL and the lateral movement amount dW are represented by the following equations (1) and (2):

$$dL = (R1+R2) \cdot \sin è \quad (1)$$

$$dW = (R1+R2) \cdot (1-\cos è) \quad (2)$$

As is clear from the equations (1) and (2), the location of the target position V2 relative to the initial position V1 is determined in relation to the first turning radius R1, the second turning radius R2, and the rotational angle è.

Assume that the lateral movement amount dW is substantially equal to the total of the lateral dimension W and the lateral interval Wa, as shown in FIG. 6. The lateral dimension W of the parking space S is the predetermined value, as aforementioned. The lateral movement amount dW is obtained by the equation (2). The lateral interval Wa is thus determined in relation to the lateral movement amount dW and the lateral dimension W. As described, the rate La/Wa becomes the predetermined constant value when the vehicle 2 is located at the initial position V1. Accordingly, the longitudinal interval La is obtained in relation to the lateral interval Wa. The position of a reference point P relative to the vehicle 2 located at the initial position V1 is thus determined. The reference point P corresponds to a corner of the parking space S, thus indicating an interfering object. It is thus possible to determine a path of the vehicle 2 that prevents the vehicle 2 from interfering with the interfering object during the parking procedure, depending on the position of the reference point P relative to the initial position V1.

As shown in FIG. 6, when the vehicle 2 is located at the target position V2 in the parking space S, the point O of the vehicle 2 is spaced from the rear end of the parking space S by a predetermined clearance ÄL. The clearance ÄL is slightly larger than the interval between the point O and the rear end of the vehicle 2. The longitudinal dimension L, which is the predetermined value used in computation for the parking procedure, is selected such that the clearance ÄL is ensured between the rear end of the vehicle 2 and the rear end of the parking space S.

Next, the assisted parking procedure of the vehicle 2 will be described in detail with reference to FIGS. 7 to 10. As shown in FIG. 7, the vehicle 2 is parallel-parked along a road shoulder in the parking space S that is located between a pair of parked vehicles 2a, 2b, which are also parallel-parked along the road shoulder. In FIG. 7, the reference numerals in brackets each correspond to a step of the parking procedure, thus indicating a state of the vehicle 2 during the step. The reference numerals in brackets of FIG. 7 correspond to those of FIGS. 8 to 10.

(Moving to the Initial Position V1)

As indicated by step (1) of FIG. 7, the vehicle 2 is first stopped at a side of the parked vehicle 2a, which is located forward from the parking space S, such that the longitudinal direction of the vehicle 2 extends substantially parallel with the longitudinal direction of the parking space S. The vehicle 2 is stopped at a position slightly forward from the initial position V1, which is shown in FIG. 6.

Subsequently, the second mode switch 15b is turned on to activate the parking assisting apparatus 1. Then, as shown in step (1) of FIG. 8, the CPU 21 displays the image of the rear view from the vehicle 2, which is acquired by the camera L1, in combination with an image of the assumed path Ia of the rear end of the vehicle 2, on the display 17. The assumed path Ia is obtained in accordance with the steering angle of the steering wheel 12 using a known method, which is described in, for example, Japanese Unexamined Patent Publication No. 11-334470. The assumed path Ia appears on the display 17, as projected on the ground.

When the shift lever 14 is shifted to "reverse" position, the reverse sensor 14 is activated. Accordingly, as shown in step (2) of FIG. 8, the CPU 21 diffuses audio instructions from the speaker 18 through the audio instruction generating circuit 25. The audio instructions include "the assisted parking procedure is started", "reverse the vehicle until the reference marker corresponds to the rear end of the adjacent vehicle", and "rotate the steering wheel to locate the parking frame at a desired parking positions". The speaker 18 diffuses the instructions in this order. Meanwhile, as shown in step (3) of FIG. 8, the CPU 21 deletes the assumed path Ia from the display 17 and displays the rear view image acquired by the camera 11 and a reference marker Ib, which is mentioned in the corresponding audio instruction, on the display 17.

The second mode switch 15b may be turned on before or after the shift lever is shifted to "reverse" position.

The reference marker Ib corresponds to a vertical plane B shown in FIG. 6 and indicates the position of the vertical plane B on the display 17. As shown in FIG. 6, the vertical plane B extends along the camera 11 of the vehicle 2 and is inclined at a predetermined angle with respect to the camera 11. The vertical plane B extends parallel with the line M. Thus, if the vehicle 2 is located at the initial position V1, the vertical plane B overlaps with the line M, as shown in, FIG. 6. The position of the line M is selected such that the vehicle 2 does not interfere with the reference point P of the parking space S during the parking procedure. Accordingly, as long as the parking procedure is started with the vehicle 2 located at the initial position V1, the vehicle 2 is prevented from interfering with the reference point P of the parking space S, which represents an interfering object.

The reference point P of FIG. 6 corresponds to a rear right corner of the parked vehicle 2a, as shown in FIG. 7. Thus, when the reference marker Ib substantially corresponds to the rear right corner of the parked vehicle 2a, as viewed on the display 17, the vehicle 2 is located at a position corresponding to the initial position V1 with respect to the parked vehicle 2a, as shown in FIG. 6.

More specifically, in accordance with an audio instruction corresponding to step (2) of FIG. 8, the vehicle 2 is reversed straight and stopped when the reference marker Ib substantially corresponds to the rear right corner of the parked vehicle 2a, as viewed on the display 17 (see step (3) of FIG. 8). In this state, the vehicle 2 is located at a position corresponding to the initial position V1 of FIG. 6, and the rate La/Wa becomes the predetermined constant value, as explained with reference to FIG. 6.

(Determining a Target Position V2)

Subsequently, the steering wheel 12 is rotated leftward in accordance with an audio instruction corresponding to step (2) of FIG. 8. When the steering angle of the steering wheel 12, which is detected by the steering angle sensor 13, becomes equal to or larger than a predetermined value, the CPU 21 generates the following audio instruction: "reverse the vehicle after the parking frame corresponds to the parking space", from the speaker 18 through the audio instruction generating circuit 25, as shown in step (4) of FIG. 8. The CPU 21 then displays the parking frame Ic, which is mentioned in the audio instruction, on the display 17, as indicated by step (5) of FIG. 9.

The parking frame Ic indicates the outline of the vehicle 2 located at the target position V2 of FIG. 6, as projected on the ground. The parking frame Ic is superimposed on the image of the camera 11, which also appears on the display 17. As aforementioned, the point O of the vehicle 2 at the target position V2 indicates the terminating point of the assumed path along which the point O of the vehicle 2 is moved during the parking procedure. The assumed path of the point O, as well as its terminating point, is selected in relation to the steering angle of the steering wheel 12. Thus, the parking frame Ic, which represents the terminating point of the assumed path, moves across the display 17 in accordance with variation in the steering angle of the steering wheel 12. The steering angle of the steering wheel 12 is adjusted to locate the parking frame Ic at a desired position in the parking space S, as viewed on the display 17, in accordance with the audio instruction of step (2) in FIG. 8.

The front end of the parking frame Ic corresponds to the front end of the vehicle 2. The rear end of the parking frame Ic corresponds to a position slightly rearward from the rear end of the vehicle 2. This ensures a sufficient clearance between The vehicle 2 and the parked vehicle 2b, which is located rearward from the vehicle 2 when the vehicle 2 is parked at the target position V2 in the parking space S.

As indicated by step (6) in FIG. 9, the steering wheel 12 is rotated leftward until the parking frame Ic is moved to a desired position (for example, a position near the road shoulder) in the parking space S, as viewed on the display 17. As aforementioned, since it is assumed that the lateral movement amount dW is substantially equal to the total of the lateral dimension W and the lateral interval Wa, the lateral interval Wa and the longitudinal interval La are obtained. In other words, the position of the vehicle 2 relative to the reference point P when the vehicle 2 is located at the initial position V1 is determined. That is, when the steering wheel 12 is rotated, the CPU 21 determines the assumed path of the vehicle 2 and detects the position of the vehicle 2 relative to the reference point P, in relation to the steering angle of the steering wheel 12. The CPU 21 then judges whether or not the assumed path of the vehicle 2 interferes with the rear right corner of the parked vehicle 2a, which is indicated by the reference point P.

If the CPU 21 decides that the assumed path of the vehicle 2 interferes with the reference point P, or the rear right corner of the parked vehicle 2a, the CPU 21 generates a requirement for changing the steering angle of the steering wheel 12. The requirement is viewed on the display 17 or is diffused as an audio instruction from the speaker 18.

Accordingly, the steering angle of the steering wheel 12, the assumed path of the vehicle 2, and the target position V2 are selected to prevent the vehicle 2 from interfering with the parked vehicle 2a during the parking procedure.

(Reversing While Turning Leftward)

Once the steering angle of the steering wheel 12 is determined, the vehicle 2 is reversed with the steering angle of the steering wheel 12 maintained at the determined value, in accordance with the audio instruction corresponding to step (4) of FIG. 8. Since the steering wheel 12 is maintained as rotated leftward, the vehicle 2 is reversed while turning leftward from the initial position V1. In this state, the CPU 21 obtains an angular change of the vehicle 2, or a leftward turning amount of the vehicle 2, with respect to the initial position V1, based on detection results of the steering angle sensor 13 and the yaw rate sensor 16. The CPU 21 then determines the position of the vehicle 2 relative to the parking space S in relation to the obtained angular change of the vehicle 2. When the angle of the vehicle 2 is altered, the CPU 21 acknowledges that the vehicle 2 starts to reverse and generates the following audio instruction: "reverse the vehicle without moving the steering wheel" from the speaker 18 through the audio instruction generating circuit 25, as shown in step (7) of FIG. 9. Meanwhile, the CPU 21 deletes the reference marker Ib and the parking frame Ic from the display 17 and re-displays the assumed path Ia of the rear end of the vehicle 2 on the display 17.

The vehicle 2 is continuously reversed without changing the steering angle of the steering wheel 12, in accordance with the audio instruction of step (7) of FIG. 9. In this state, the CPU 21 compares a current value of the leftward turning amount of the vehicle 2, which is obtained in relation to the detection results of the steering angle sensor 13 and the yaw rate sensor 16, with a desired value at which the steering direction of the vehicle 2 should be switched. The desired value of the leftward turning amount of the vehicle 2 is determined in accordance with the first arched path C1 of FIG. 6. When the current value of the leftward turning amount of the vehicle 2 reaches a predetermined value that is smaller than the desired value, the CPU 21 acknowledges that the steering wheel 12 must be rotated rightward without delay.

Subsequently, as shown in step (9) of FIG. 9, the CPU 21 generates the following audio instruction: "rotate the steering wheel rightward to the maximum angle after the assumed rightward path reaches the road shoulder", from the speaker 18 through the audio instruction generating circuit 25. Meanwhile, as shown in step (10) of FIG. 10, the CPU 21 displays an assumed path Id along which the vehicle 2 is steered rightward, in addition to the assumed path Ia, which is currently shown on the display 17. More specifically, the assumed path Id indicates a path along which the rear end of the vehicle 2 is moved if the steering wheel 12 is rotated rightward to the maximum angle at the current position of the vehicle 2. The assumed path Id appears on the display 17, as projected on the ground.

In accordance with the audio instruction of step (9) of FIG. 9, the vehicle 2 is continuously reversed while turning leftward without changing the steering angle of the steering wheel 12 until the assumed path Id reaches the road shoulder, as viewed on the display 17. When the assumed path Id reaches the road shoulder, the vehicle 2 is stopped, as shown in step (11) of FIG. 10. The steering wheel 12 is then rotated rightward to the maximum steering angle.

Alternatively, immediately before the steering wheel 12 is rotated rightward, the CPU 21 may generate the following audio instruction: "stop the vehicle and rotate the steering wheel rightward to the maximum angle".

(Reversing While Turning Rightward)

The CPU 21 acknowledges that the steering wheel 12 is rotated rightward to the maximum angle by means of the steering angle sensor 13. The CPU 21 then generates the following instruction: "reverse the vehicle without moving the steering wheel" from the speaker 18 through the audio instruction generating circuit 25, as shown in step (12) of FIG. 10. Subsequently, as shown in step (13) of FIG. 10, the CPU 21 deletes the assumed path Id from the display 17 and displays a pair of side indicating lines Ie and a pair of clearance indicating lines If, in addition to the assumed path Ia.

Each side indicating line Ie indicates a hypothetical line section extending along a corresponding lateral side of the vehicle 2, as viewed on the display 17. Each clearance indicating line If indicates a hypothetical line section spaced from the rear end of the vehicle 2 by an associated predetermined distance, as viewed on the display 17. For example, one interval indicating line If corresponds to a hypothetical line section spaced from the rear end of the vehicle 2 by fifty centimeters, and the other corresponds to a hypothetical line section spaced from the rear end of the vehicle 2 by one meter. The lines Ie, If appear on the display 17 as projected on the ground.

In accordance with the audio instruction corresponding to step (12) of FIG. 10, the vehicle 2 is reversed with the steering angle of the steering wheel 12 maintained as rotated rightward to the maximum angle. The vehicle 2 is thus reversed while turning rightward from the position at which the rotating direction of the steering wheel 12 is switched, or the position corresponding to the contact point P1 between the first arched path C1 and the second arched path C2, as shown in FIG. 6. In this state, the driver acknowledges the positions of the side indicating lines Ie relative to the road shoulder and the positions of the clearance indicating lines If relative to the parked vehicle 2b, which is located rearward from the parking space S, by means of the image on the display 17, as indicated by step (13) of FIG. 10.

Further, the CPU 21 obtains a current angular difference of the vehicle 2 with respect to the initial position V1, in accordance with the detection results of the steering angle sensor 13 and the yaw rate sensor 16. If the current angular difference becomes smaller than a predetermined value, the CPU 21 determines that the vehicle 2 has reached a position close to the target position V2, or that the longitudinal direction of the vehicle 2 currently extends substantially parallel with the longitudinal direction of the parking space S. The CPU 21 then generates the following audio instruction: "check the rear view", from the speaker 18 through the audio instruction generating circuit 25, as shown in step (14) of FIG. 10. The rear view from the vehicle 2 is thus checked directly without looking at the display 17 or indirectly by looking at the display 17, in accordance with the audio instruction. The vehicle 2 is then stopped at an optimal position. In this state, for example, an image corresponding to step (15) of FIG. 10 appears on the display 17.

When determining that the angular change per unit time of the vehicle 2 becomes smaller than a predetermined value based on the detection results of the steering angle sensor 13 and the yaw rate sensor 16, the CPU 21 acknowledges that the vehicle 2 is stopped. The CPU 21 then generates the following audio instruction: "the assisted parking procedure is completed", from the speaker 18 through the audio instruction generating circuit 25, as indicated by step (16) of FIG. 10.

Subsequently, for example, the neutral position of the steering wheel 12 is restored and the vehicle 2 is moved to adjust the position of the vehicle 2 in the longitudinal direction of the parking space S.

During steps (6) through (16), the CPU 21 judges whether or not the vehicle 2 is moving along the assumes path, which is determined in relation to the steering angle of the steering wheel 12 when the vehicle 2 is stopped at the initial position V1, based on the detection results of the sensors 13, 16. If the CPU 21 judges that the vehicle 2 is not moving along the assumed path, an audio instruction is diffused, for example, to inform the driver of the fact that the vehicle 2 is located offset from the assumed path. Alternatively, the CPU 21 indicates information needed for correcting the moving path of the vehicle 2 on the display 17. Further, if the moving path of the vehicle 2 is not correctable, the CPU 21 generates an audio instruction for repeating the parking procedure from the beginning.

In addition, if the parking space S in which the vehicle 2 should be parked is located rightward from the driver, a corresponding assisted parking procedure is performed in the same manner as the above description.

The first embodiment has the following advantages.

The assumed path Id, which appears on the display 17, enables the driver to easily acknowledge when the rotating direction of the steering wheel 12 should be switched in the assisted parking procedure. The parking procedure is thus performed easily such that the vehicle 2 is parked at a desired position easily and accurately.

The position of the vehicle 2 relative to the parking space S, or the position of the vehicle 2 relative to the target position V2, is detected based on the detection result of the steering angle sensor 13 and the yaw rate sensor 16. The assumed path Id appears on the display 17 at an appropriate timing in accordance with the detected position of the vehicle 2 relative to the parking space S.

Further, in accordance with the detected position of the vehicle 2 relative to the parking space S, or the position of the vehicle 2 relative to the target position V2, the CPU 21 judges whether or not the vehicle 2 is moving along the assumed path. If the vehicle 2 is not moving along the assumed path, the driver is informed of the fact that the vehicle 2 is located offset from the assumed path. This enables the driver to park the vehicle 2 at an optimal position in the parking space S without interfering with an object.

When the rotating direction of the steering wheel 12 is switched and the assumed path Id no longer need be shown on the display 17, the assumed path Id is deleted from the display 17. Thus, no unnecessary indicators appear on the display 17. This makes it easy to view the image on the display 17.

When the rotating direction of the steering wheel 12 is switched, the steering wheel 12 is rotated to the maximum angle. This simplifies various computation processes that are performed during the parking procedure. Further, after the rotating direction of the steering wheel 12 is switched, the steering wheel 12 is easily maintained at a constant angle, which is the maximum angle.

The side indicating lines Ie and the interval indicating lines If appear on the display 17 at a final stage of the assisted parking procedure. This prevents the vehicle 2 from interfering with the object, and the position of the vehicle 2 relative to the parking space S is easily adjusted.

When the reference marker Ib substantially corresponds to the rear right corner of the parked vehicle 2a, which is indicated by the reference point P, the vehicle 2 is located at the initial position V1. In this state, the rate La/Wa becomes the predetermined constant value (see FIG. 6). In other words, when the vehicle 2 is located at the initial position V1, the vehicle 2 is located at a constant position relative to the reference point P. Further, the position of the parking frame Ic on the display 17 is determined in relation to the steering angle of the steering wheel 12 when the vehicle 2 is located at the initial position V1. The position of the parking frame Ic represents the target position V2 at which the vehicle 2 is parked. The lateral interval Wa between the vehicle 2 and the reference point P is obtained in accordance with the position of the parking frame Ic. The longitudinal interval La between the vehicle 2 and the reference point P is obtained in relation to the constant rate La/Wa and the lateral interval Wa. Accordingly, the parking assisting apparatus 1 of the first embodiment easily detects the position of the vehicle 2 relative to the reference point P when the vehicle 2 is located at the initial position V1, without employing an additional sensor.

As described, the position of the vehicle 2 relative to the reference point P when the vehicle 2 is located at the initial position V1 is determined such that the assumed path of the vehicle 2 is selected to prevent the vehicle 2 from interfering with the reference point P (the object) during the parking procedure.

(Second Embodiment)

A second embodiment of the present invention will hereafter be described with reference to FIGS. 11 to 12(b). The description focuses on the difference between the first embodiment illustrated in FIGS. 1 to 10 and the second embodiment. More specifically, the initial position V1 of the second embodiment at which the vehicle 2 is initially located is determined depending only on the longitudinal interval La, unlike the first embodiment in which the initial position V1 is determined depending on the constant rate La/Wa.

Figure 11:
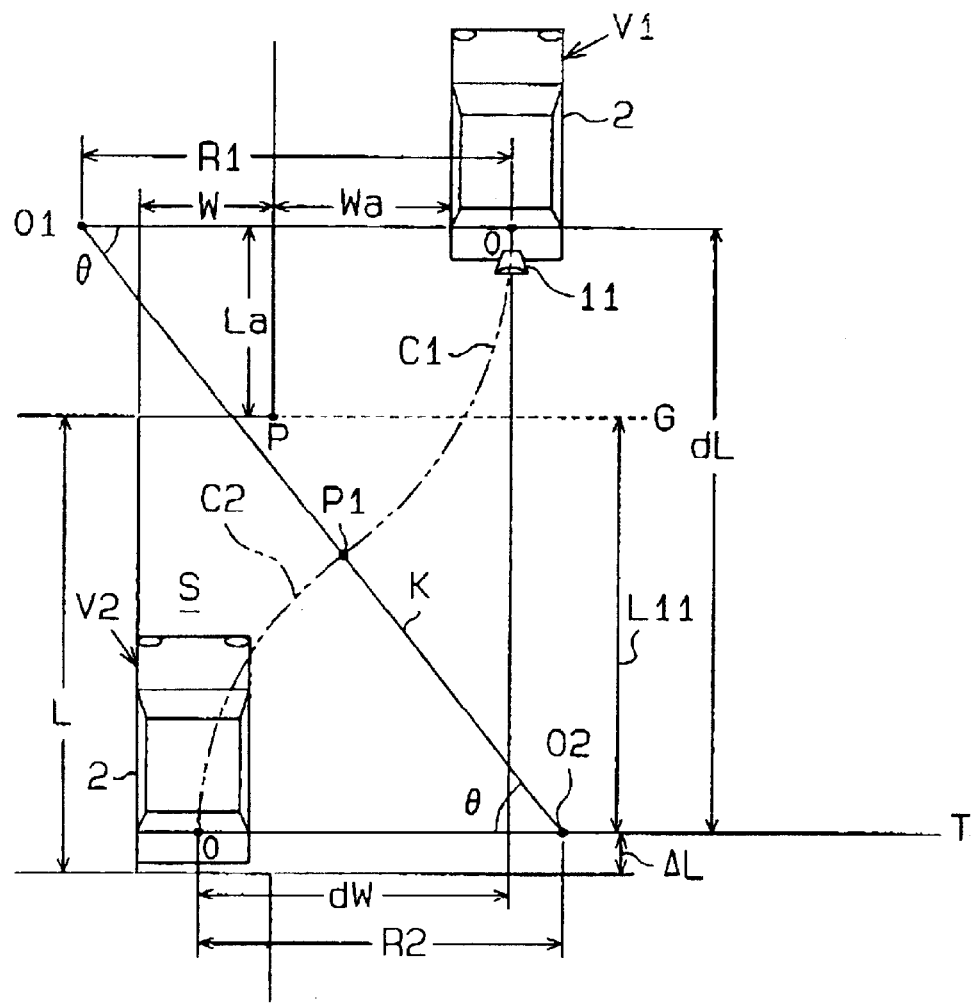
FIG. 11 is a plan view showing an initial position and a target position of a vehicle that is parallel-parked in a parking space in accordance with an assisted parallel parking procedure of a second embodiment according to the present invention.

FIG. 11 corresponds to FIG. 6. In this embodiment, it is defined that the vehicle 2 is located at the initial position V1 when the longitudinal interval La between the reference point P and the point O, which corresponds to the midpoint between the rear wheels of the vehicle 2, becomes a predetermined constant value.

When the vehicle 2 is located at the target position V2, the point O is longitudinally spaced from the reference point P by an interval L11 and is located on a line T that extends parallel with the lateral direction of the vehicle 2. In other words, it is defined that the vehicle 2 is located at the target position V2 when the point O is located on the line T. Like the interval L1 of FIG. 6, the interval L11 is a predetermined value selected in accordance with the longitudinal dimension L and the lateral dimension W of the parking space S as well as the clearance $\overset{\approx}{\text{AL}}$, which are stored in the controller 20.

When the vehicle 2 is located at the initial position V1 with the second mode switch 15b turned on and the steering wheel 12 is rotated, the assumed path of the point O during the assisted parking procedure is determined in relation to the steering angle of the steering wheel 12, using a similar method to that of the first embodiment. However, the second arched path C2 of the second embodiment is determined in a different manner from that of the first embodiment. That is, in the second embodiment, if a certain arch with the second turning radius R2 forms a circumscribed circle with respect to the first arched path C1 and a tangential line of the arch that crosses the point at which the arch crosses the line T extends parallel with the longitudinal direction of the parking space S, the arch is selected as the second arched path C2. The point at which the second arched path C2 crosses the line T corresponds to the point O of the vehicle 2 located at the target position V2, which is the terminating point of the assumed path. Further, the center O2 of the second arched path C2 is located on the line T.

When the vehicle 2 is moved from the initial position V1 to the target position V2 in the parking procedure, the longitudinal movement amount dL and the lateral movement amount dW of the point O are obtained by the equations (1), (2), as explained about the first embodiment of FIGS. 1 to 10. Further, when the vehicle 2 is located at the initial position V1, the longitudinal interval La becomes the predetermined constant value. In addition, it is assumed that the lateral movement amount dW is substantially equal to the total of the lateral dimension W and the lateral interval Wa, as shown in FIG. 11. Based on the assumption, the lateral interval Wa is obtained in relation to the lateral movement amount dW and the lateral dimension W, like the embodiment illustrated in FIGS. 1 to 10. As a result, the position of the vehicle 2 relative to the reference point P when the vehicle 2 is located at the initial position V1 is determined.

Next, the assisted parking procedure of the second embodiment will be described with reference to FIGS. 12(a) and 12(b). The description focuses on the difference between the procedure of the first embodiment, which is shown in FIGS. 8 to 10, and that of the second embodiment. In the second embodiment, the vehicle 2 is parallel-parked in the parking space S along a road shoulder. Like the first embodiment, the parking space S of the second embodiment is located between the parked vehicles 2a, 2b that are also parallel-parked along the road shoulder.

Like the first embodiment of FIGS. 1 to 10, the vehicle 2 is stopped at a side of the parked vehicle 2a, which is located forward from the parking space S, such that the longitudinal direction of the vehicle 2 extends substantially parallel with the longitudinal direction of the parking space S. In this state, the vehicle 2 is stopped at a position slightly forward from the initial position V1, which is shown in FIG. 11.

Subsequently, the second mode switch 15b is turned on, thus activating the parking assisting apparatus 1. The steps corresponding to steps (1) and (2) of FIG. 8 are thus performed. In the subsequent step, which corresponds to step (3) of FIG. 8, a reference marker Ig appears on the display 17, in addition to the image of the rear view from the vehicle 2 acquired by the camera 11, as shown in FIG. 12(a). The reference marker Ig is mentioned in an audio instruction of this step.

The reference marker Ig of this step is different from the reference marker Ib of step (3) of FIG. 8. More specifically, the reference marker Ig indicates the position of a lateral line G of FIG. 11, as viewed on the display 17. As shown in FIG. 11, the line G is spaced longitudinally rearward from the point O by the interval La and laterally extends at a height that is substantially equal to that of the rear bumper of the vehicle 2. Thus, if the vehicle 2 is located at the initial position V1, the lateral line G crosses the reference point P, as shown in FIG. 11. The lateral interval La is selected to prevent the vehicle 2 from interfering with the reference point P of the parking space S during the parking procedure. Accordingly, if the assisted parking procedure is initiated with the vehicle 2 located at the initial position V1, the vehicle 2 is prevented from interfering with the reference point P of the parking space S, which indicates an interfering object.

Figure 12A:
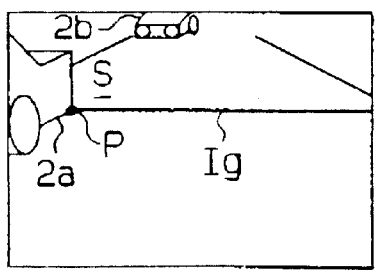
FIGS. 12(a) and 12(b) are views each showing a display state of a display during the assisted parallel parking procedure of the second embodiment.

As shown in FIG. 12(a), the reference point P of FIG. 11 corresponds to the rear right corner of the parked vehicle 2a. Thus, when the reference marker Ig substantially corresponds to the rear right corner of the parked vehicle 2a, as viewed on the display 17, the vehicle 2 is located at a position corresponding to the initial position V1 of FIG. 11 with respect to the parked vehicle 2a.

More specifically, in accordance with an audio instruction of the step corresponding to step (2) of FIG. 8, the vehicle 2 is reversed straight and stopped when the reference marker Ig substantially corresponds to the rear right corner of the parked vehicle 2a, as viewed on the display 17 (see FIG. 12(a)). In this state, the vehicle 2 is stopped at a position corresponding to the initial position V1 of FIG. 11 such that the longitudinal interval La becomes the predetermined constant value.

Next, the steering wheel 12 is rotated leftward in accordance with the audio instruction of the step corresponding to step (2) of FIG. 8. When the steering angle of the steering wheel 12, which is detected by the steering angle sensor 13, becomes equal to or greater than a predetermined value, the steps corresponding to steps (4), (5) of FIG. 8 are performed. In the step corresponding to step (5) of FIG. 8, the parking frame Ic appears on the display 17, as shown in FIG. 12(b). Since the target position V2 of the vehicle 2 is located on the line T, as shown in FIG. 11, the parking frame Ic moves laterally on the display 17 in relation to the steering angle of the steering wheel 12. The steering angle of the steering wheel 12 is adjusted to locate the parking frame Ic at a desired position in the parking space S, as viewed on the display 17.

The subsequent steps are identical to those described with reference to FIGS. 7 to 10, and description thereof is omitted. Further, the second embodiment has the same advantages as those of the first embodiment.

The illustrated embodiments of the present invention may be modified as follows.

Figure 13A:
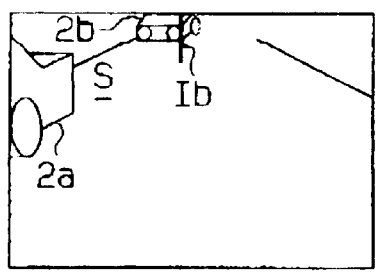
FIGS. 13(a) and 13(b) are view s each showing a modified example of the display state of the display during the assisted parallel parking procedure of the first embodiment.
Figure 13B:
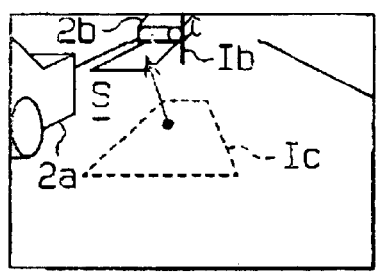

FIGS. 13(a) and 13(b) show a modification of the first embodiment shown in FIGS. 1 to 10. In this modification, the reference point P corresponds to the front left corner of the parked vehicle 2b, which is located rearward from the parking space S. When the reference marker Ib substantially corresponds to the front left corner of the parked vehicle 2b, the vehicle 2 is located at the initial position V1 such that the position of the vehicle 2 relative to the reference point P satisfies a certain condition.

Figure 14A:
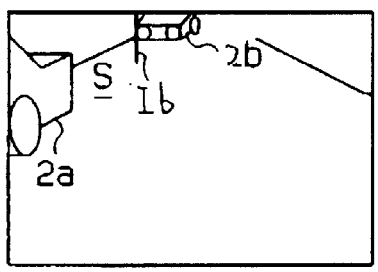
FIGS. 14(a) and 14(b) are views each showing a modified example of the display state of the display during the assisted parallel parking procedure of the first embodiment.
Figure 14B:
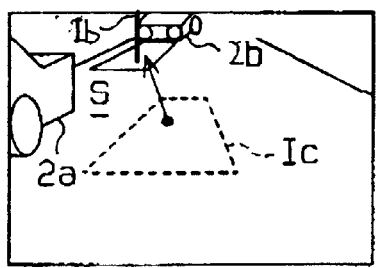

FIGS. 14(a) and 14(b) show a modification of the first embodiment shown in FIGS. 1 to 10. In this modification, the reference point P corresponds to the front right corner of the parked vehicle 2b, which is located rearward from the parking space S. When the reference marker,Ib substantially corresponds to the front right corner of the parked vehicle 2b, the vehicle 2 is located at the initial position V1 such that the position of the vehicle 2 relative to the reference point P satisfies a certain condition.

Figure 12B:
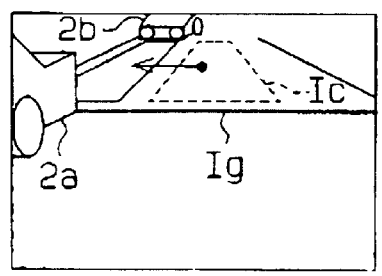
Figure 15A:
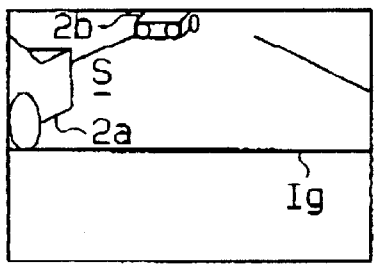
FIGS. 15(a) and 15(b) are views each showing a modified example of the display state of the display during the assisted parallel parking procedure of the second embodiment.
Figure 15B:
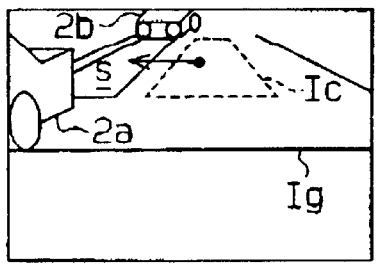

FIGS. 15(a) and 15(b) show a modification of the second embodiment shown in FIGS. 11 to 12(b). In this modification, the reference point P corresponds so the rear wheels, or the rear wheel portions that contact the ground, of the parked vehicle 2a that is located forward from the parking space S. When the reference marker Ig substantially corresponds to the rear wheel portions of the parked vehicle 2a that contact the ground, the vehicle 2 is located at the initial position V1 such that the position of the vehicle 2 relative to the reference point P satisfies a certain condition.

Figure 16A:
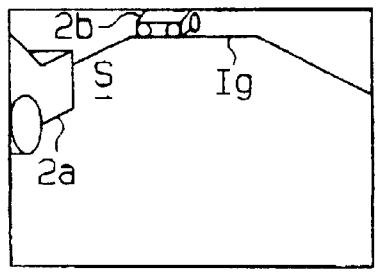
FIGS. 16(a) and 16(b) are views each showing a modified example of the display state of the display during the assisted parallel parking procedure of the second embodiment.
Figure 16B:
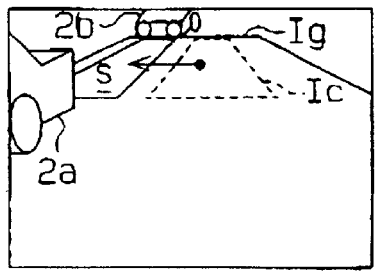

FIGS. 16(a) and 16(b) show a modification of the second embodiment shown in FIGS. 11 to 12(b). In this modification, the reference point P corresponds to the front end of the parked vehicle 2b, which is located rearward from the parking space S. When the reference marker Ig substantially corresponds to the front end of the parked vehicle 2b, the vehicle 2 is located at the initial position V1 such that the position of the vehicle 2 relative to the reference point P satisfies a certain condition.

Figure 17:
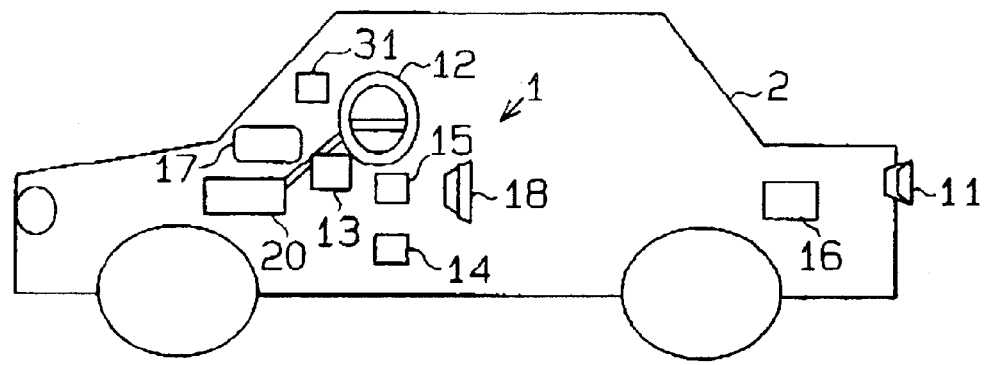
FIG. 17 is a view schematically showing a vehicle equipped with a parking assisting apparatus of another embodiment according to the present invention.
Figure 18:
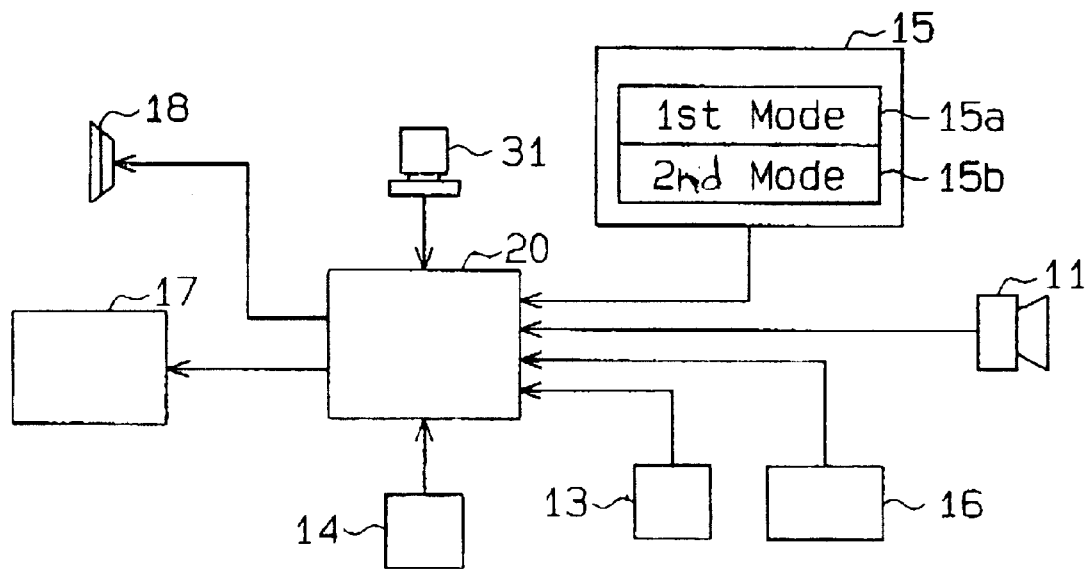
FIG. 18 is a block diagram showing the parking assisting apparatus of FIG. 17.

As shown in FIG. 17 and 18, a manipulator such as a joystick 31 may replace the steering wheel 12. The manipulator 31 is manipulated to move the parking frame Ic to a desired position, as viewed on the display 17. In this case, the display 17 or the speaker 18 enables the driver to acquire a steering angle of the steering wheel 12 that is needed for moving the vehicle 2 to the finally selected position of the parking frame Ic.

In the illustrated embodiments, the second mode switch 15b is turned on to activate the parking assisting apparatus 1. However, the parking assisting apparatus 1 may be activated by means of a voice recognizing device, which recognizes a vocal instruction produced by the driver.

During the assisted parking procedure, a sensor that detects rotation of the wheels of the vehicle 2 or an acceleration sensor may detect that the vehicle 2 is stopped or started. Alternatively, a voice recognizing device may recognize a vocal announcement of the driver, thus detecting that the vehicle 2 is stopped or started.

During the assisted parking procedure, the position of the vehicle 2 relative to the parking space S may be detected depending only on the detection result of the yaw rate sensor 16. Further, the position of the vehicle 2 relative to the parking space S may be detected in accordance with a detection result of a sensor that detects rotation of the wheels of the vehicle 2. In addition, the position of the vehicle 2 relative to the parking space S may be detected in relation to a timer measurement.

During the assisted parking procedure, an object may be detected based on an image acquired by the camera 11 or a detection result of an object sensor. The object detection is used in determination of the path along which the vehicle 2 is moved during the parking procedure.

In the first embodiment shown in FIGS. 1 to 10, the driver judges when the rotating direction of the steering wheel 12 should be switched based on the assumed path Id, which appears on the display 17. However, the driver may be informed of when the rotating direction of the steering wheel 12 should be switched through a prescribed image that appears on the display 17 or an audio instruction that is diffused from the speaker 18.

When the rotating direction of the steering wheel 12 is switched, the steering wheel 12 does not necessarily have to be rotated to the maximum angle. Instead, the steering wheel 12 may be rotated to a predetermined angle that is smaller than the maximum value.

When the assisted parking procedure is performed, all steps shown in FIGS. 8 to 10 do not necessarily have to be executed. For example, in accordance with the driver's skill, unnecessary steps may be omitted.

The present invention is not restricted to the illustrated parking procedure, which is a parallel parking procedure. However, the present invention may be applied to various parking procedure in which the steering wheel 12 is manipulated.

The present invention may be applied to a parking assisting apparatus that includes a camera that is attached to a front portion of the vehicle 2. In a corresponding assisted parking procedure, the vehicle 2 is moved forward.

The present invention may be applied to a system that obtains data needed for an assisted parking procedure from an external source of the vehicle 2. In this case, the parking procedure is performed in accordance with the external data.

Therefore, the present examples and embodiments are to be considered as illustrative and not restrictive and the invention is not to be limited to the details given herein, but may be modified within the scope and equivalence of the appended claims.

What is claimed is:

1. A parking assisting apparatus for assisting a driver in a parking operation of a vehicle, wherein the vehicle is moved with a steering device rotated in a first direction and the vehicle is then moved with the steering device rotated in a second direction opposite to that of the first direction, said parking assisting apparatus comprising:

a display, located in a passenger compartment, that displays an image of a view acquired by a camera, as viewed in a direction in which the vehicle moves, and a control means which assumes a path along which the vehicle is moved during the parking operation, wherein the control means determines an initial steering angle of the steering device, the initial steering angle corresponding to the steering angle of the steering device when initiating the parking operation, the control means assumes the path of the vehicle based on the assumption that the parking operation with the steering device rotated in the first direction is performed with the initial steering angle and the parking operation with the steering device rotated in the second direction is performed with the steering angle maintained at a predetermined value after the steering device is rotated in the second direction, and the control means instructs the display to indicate steering information that informs the driver of a timing at which the steering device must be rotated in the second direction in accordance with the assumed path.

2. The apparatus as set forth in claim 1, wherein the control means determines a target position at which the vehicle is eventually parked in accordance with manipulation of a manipulator and assumes the path of the vehicle in accordance with the target position, and the control means determines the initial steering angle based on the assumed path.

3. The apparatus as set forth in claim 1, further comprising a detecting means that detects a change a the position of the vehicle, wherein the control means determines a timing at which the display indicates the steering information, in accordance with a detection result of the detection means.

4. The apparatus as set forth in claim 2, further comprising a detecting means that detects a change of a position of the vehicle, wherein the control means determines a timing at which the display indicates the steering information, in accordance with a detection result of the detection means.

5. The apparatus as set forth in claim 2, further comprising a detection means that detects a position of the vehicle relative to the target position, wherein the control means determines a timing at which the display indicates the steering information, in accordance with a detection result of the detection means.

6. The apparatus as set forth in claim 4, wherein the assumed path includes a first path that indicates a path along which the vehicle is moved during the parking operation with the steering device rotated in the first direction and a second path that indicates a path along which the vehicle is moved during the parking operation with the steering device rotated in the second direction, and the control means instructs the display to indicate the steering information when the vehicle is located near a terminating point of the first path in the parking operation with the steering device in the first direction.

7. The apparatus as set forth in claim 5, wherein the assumed path includes a first path that indicates a path along which the vehicle is moved during the parking operation with the steering device in the first direction and a second path that indicates a path along which the vehicle is moved during the parking operation with the steering device in the second direction, and the control means instructs the display to indicate the steering information when the vehicle is located near a terminating point of the first path in the parking operation with the steering device in the first direction.

8. The apparatus as set forth in claim 1, wherein the control means deletes the steering information from the display when the steering device is rotated in the second direction for beginning the parking operation with the steering device in the second direction.

9. The apparatus as set forth in claim 2, wherein the control means deletes the steering information from the display when the steering device is rotated in the second direction for beginning the parking operation with the steering device in the second direction.

10. The apparatus as set forth in claim 1, further comprising a detecting means that detects a change of a position of the vehicle, wherein the control means judges whether or not the vehicle is located offset from the assumed path, based on a detection result of the detecting means.

11. The apparatus as set forth in claim 2, further comprising a detecting means that detects a change of a position of the vehicle, wherein the control means judges whether or not the vehicle is located offset from the assumed path, based on a detection result of the detecting means.

12. The apparatus as set forth in claim 2, further comprising a detecting means that detects a position of the vehicle relative to the target position, wherein the control means judges whether or not the vehicle is located offset from the assumed path, based on a detection result of the detecting means.

13. The apparatus as set forth in claim 1, wherein the control means instructs the display to indicate a reference marker for determining an initial position of the vehicle when the parking operation is started, and when the reference marker and a reference object in the view that appears on the display are located at predetermined positions relative to each other, the vehicle is located at the initial position such that the vehicle at the initial position is located at a predetermined position relative to the reference object.

14. The apparatus as set forth in claim 2, wherein the control means instructs the display to indicate a reference marker for determining an initial position of the vehicle when the parking procedure is started, and when the reference marker and a reference object in the view that appears on the display are located at predetermined positions relative to each other, the vehicle is located at the initial position such that the vehicle at the initial position is located at a predetermined position relative to the reference object.

15. The apparatus as set forth in claim 1, wherein the control means instructs the display to indicate a reference marker for determining an initial position of the vehicle when the parking procedure is started, when the reference marker and a reference object in the view that appears on the display are located at predetermined positions relative to each other, the vehicle is located at the initial position such that the vehicle at the initial position is located at a predetermined position relative to the reference object, and when the vehicle is located at the initial position, the control means instructs the display to indicate a mark that represents a target position at which the vehicle is eventually parked in accordance with the assumed path.

16. The apparatus as set forth in claim 15, wherein when the vehicle is located at the initial position, the control means detects a position of the vehicle relative to the reference object with reference to a position of the mark on the display.

17. The apparatus as set forth in claim 16, wherein when the vehicle is located at the initial position, the vehicle is located on a horizontal line that intersects the reference object and inclines in a predetermined direction, the control means determines a lateral interval between the vehicle and the reference object that is measured in a lateral direction of the vehicle in accordance with the position of the mark on the display, and the control means detects the position of the vehicle relative to the reference object based on the lateral interval when the vehicle is located at the initial position.

18. The apparatus as set forth in claim 16, wherein the vehicle is spaced from the reference object in a longitudinal direction of the vehicle by a predetermined longitudinal interval when the vehicle is located at the initial position, the control means determines a lateral interval between the vehicle and the reference object that is measured in a lateral direction of the vehicle in accordance with the position of the mark on the display, and the control means detects the position of the vehicle relative to the reference object based on the longitudinal interval and the lateral interval.

19. The apparatus as set forth in claim 16, wherein the control means determines the assumed path that prevents the vehicle from interfering with the reference object, based on the position of the vehicle relative to the reference object.

20. The apparatus as set forth in claim 1, wherein the steering angle after the steering device is rotated in the opposite direction is fixed to a maximum acceptable value.

* * * * *

UNITED STATES PATENT AND TRADEMARK OFFICE
CERTIFICATE OF CORRECTION

PATENT NO. : 6,487,481 B2
DATED : November 26, 2002
INVENTOR(S) : Yuu Tanaka et al.

It is certified that error appears in the above-identified patent and that said Letters Patent is hereby corrected as shown below:

<u>Title page,</u>
Item [73], Assignee, "Toyota Jidoshakabushiki Kaisha" should read
-- TOYOTA JIDOSHA KABUSHIKI Kaisha--.

Signed and Sealed this

Eleventh Day of January, 2005

JON W. DUDAS
*Director of the United States Patent and Trademark Office*